June 16, 1942.  C. MARTIN  2,286,217
ROTARY TOOLHEAD
Filed Nov. 27, 1940  2 Sheets-Sheet 1
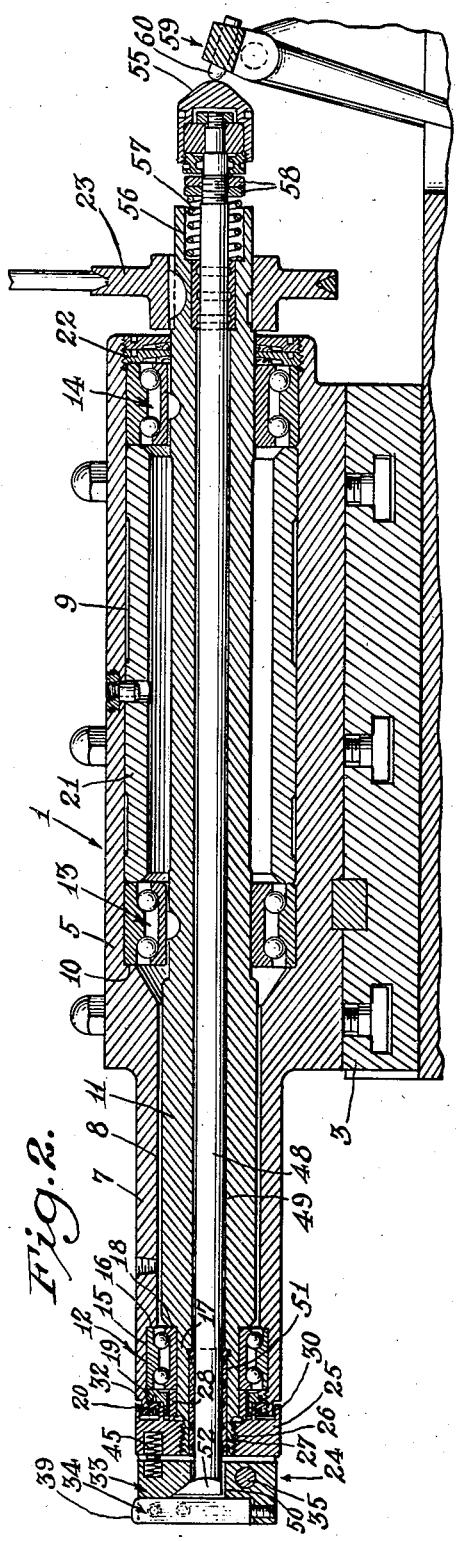
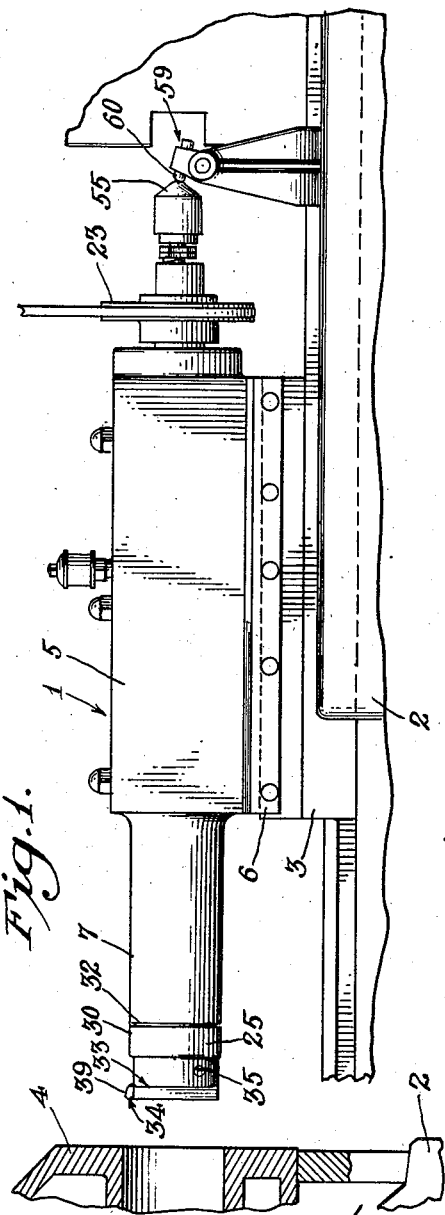
Inventor
Charles Martin
BY
Parker, Carlson, Pitzner & Hubbard
Attorneys.

June 16, 1942. C. MARTIN 2,286,217
ROTARY TOOLHEAD
Filed Nov. 27, 1940 2 Sheets-Sheet 2
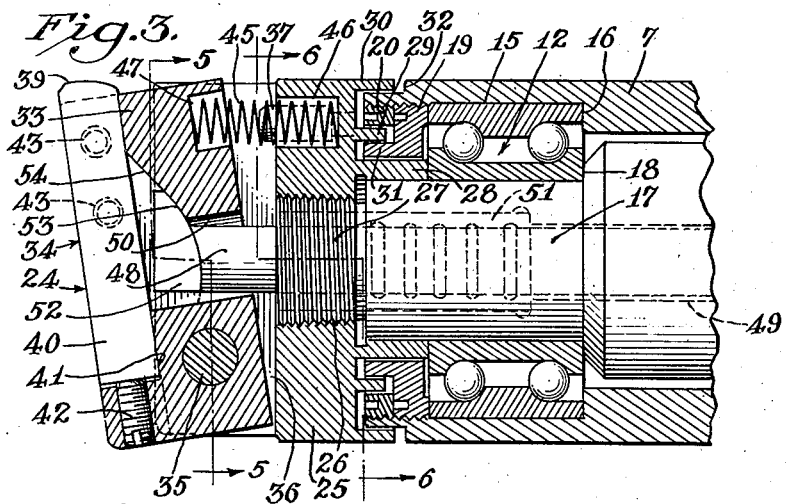
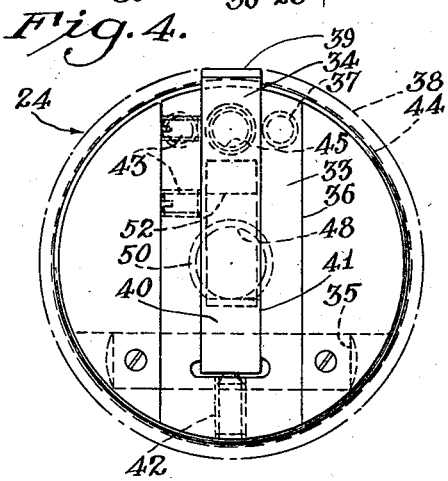 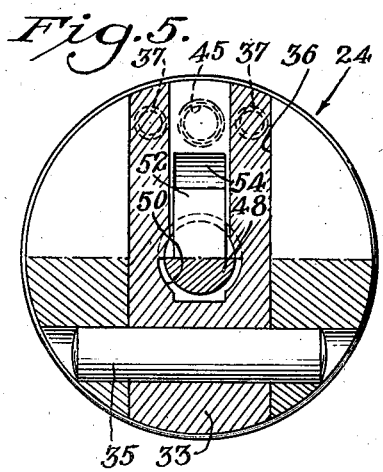
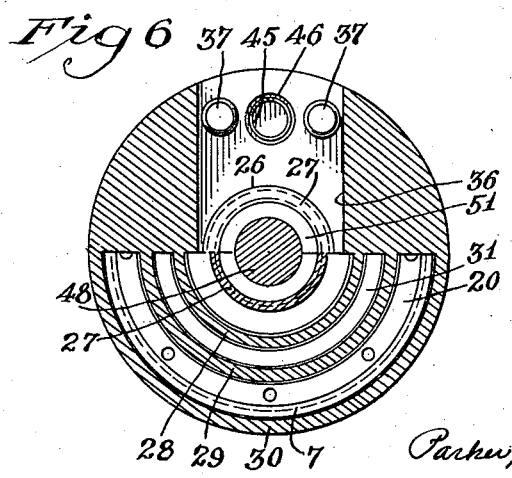
Inventor
Charles Martin
BY
Parker, Carlson, Pitzner & Hubbard
Attorneys.

Patented June 16, 1942

2,286,217

UNITED STATES PATENT OFFICE 2,286,217

ROTARY TOOLHEAD

Charles Martin, Detroit, Mich., assignor to Ex-Cell-O Corporation, Detroit, Mich., a corporation of Michigan Application November 27, 1940, Serial No. 367,440

7 Claims. (Cl. 77—3)

The present invention relates to rotary toolheads and has particular reference to a new and improved toolhead adapted to support a boring tool for movement selectively into operative position defining the cutting circle of revolution and into an inoperative retracted position within said circle of revolution for clearance from the work.

One of the objects of the present invention is to provide a novel toolhead with a retractable tool in which the tool is rigidly supported in operative position.

A further object is to provide a new and improved toolhead having a tool pivotal on an axis extending transversely of the axis of spindle rotation in such a manner that upon forward movement in a cutting direction, the cutting thrust tends to maintain the tool in operative or cutting position against a positive stop defining a cutting circle of revolution, and upon reverse movement the tool is retracted from the stop to define a smaller circle of revolution clearing the work.

Other objects and advantages will become apparent as the description proceeds.

In the accompanying drawings:

Figure 1 is a fragmentary side elevation of a reciprocatory spindle provided with a rotary toolhead embodying the features of my invention.

Fig. 2 is a vertical axial sectional view of the spindle and toolhead showing the tool in operative cutting position.

Fig. 3 is a fragmentary axial vertical sectional view of the toolhead showing the tool in retracted position.

Fig. 4 is an end elevational view of the toolhead.

Fig. 5 is a transverse sectional view taken substantially along the line 5—5 of Fig. 3.

Fig. 6 is a transverse sectional view taken substantially along line 6—6 of Fig. 3.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the toolhead, constituting the exemplary embodiment of the invention, is supported on and driven by a spindle structure 1 adapted for use in a boring machine. One form of boring machine is fragmentarily illustrated as having a base 2 supporting a reciprocatory carriage 3. The spindle structure 1 is mounted on the carriage 3 for axial movement in a forward direction to bore a workpiece 4. In the present instance, the spindle structure 1 comprises an elongated body or bracket 5 which is rectangular in transverse cross section, with flat parallel sides and flat top and bottom surfaces, and which is bolted to the carriage 3 in position against a locating flange 6 extending along one edge of the latter. A longitudinal tubular extension or sleeve 7 is integral with the forward end of the spindle body 5 and has an axial bore 8 opening therethrough. The body 5 is formed with a bore 9 which is larger than, but coaxial with, the bore 8 and which extends from a shoulder 10 to the rear end.

A rotary spindle 11 extends axially in freely spaced relation through the bores 8 and 9, and is suitably supported therein by a plurality of spaced antifriction bearings 12, 13 and 14. The outer raceway of the bearing 12 is seated in a counterbore 15 against a shoulder 16 in the forward end of the tubular extension 7, and the inner raceway of this bearing is fixed on a reduced extension 17 against a shoulder 18 on the free end of the spindle 11. The outer raceway of the bearing 12 is secured in position by an annular nut 19 threaded into the outer end of the counterbore 15 and an ennular lock nut 20 in turn threaded against the nut 19.

Of the bearings 13 and 14, the inner raceways are keyed to the spindle 11, and the outer raceways are separated by a spacer sleeve 21 and secured therewith as an assembly within the bore 9 against the shoulder 10 by means of suitable annular lock nuts 22. Fixed on the rear projecting end of the spindle 11 is a pulley 23 which is adapted to be connected to a suitable source of power (not shown).

Secured to the forward end of the spindle 11 for rotation therewith is a toolhead 24. In its preferred form, the toolhead 24 comprises a generally cylindrical body 25 having a tapped axial bore 26 threaded onto a reduced screw extension 27 on the spindle 11, and having an annular flange 28 snugly receiving the spindle extension 17 and abutting against the inner raceway of the bearing 12. Preferably, the body 25 of the toolhead 24 is substantially the same or slightly less in diameter as the tubular extension 7, and is closely contiguous to the free end of the latter.

To provide a seal for the bearing 12, the rear face of the body 25 is formed with two spaced annular flanges 29 and 30 concentric with the flange 28. The flange 29 projects rotatably between the lock nut 20 and an annular flange 31 on the nut 19, and the flange 30 projects rotatably into a peripheral external notch 32 in the end of the tubular extension 7.

Pivotally mounted in the front face of the body 25 for swinging movement about an axis extending transversely of the axis of the spindle 11 is a toolholder 33 adapted to support a radially projecting cutting tool 34. In the preferred form, the toolholder 33 consists of a generally rectangular clapper box having flat parallel sides and having arcuate ends conforming in shape to the periphery of the body 25. The clapper box 33 is pivotally supported at one end on a pin 35 for swinging movement within a diametrical groove or notch 36 in the forward end or face of the body 25, the sides of the notch being complemental to and in close sliding engagement with the sides of the box to prevent the entry of foreign matter. Two spaced pins 37 project forwardly from the root of the notch 36 for engagement with the inner face of the clapper box 33, and constitute a fixed positive stop for defining the operative or cutting position of the tool 34. In this position, the tool 34 is disposed radially to generate the cutting circle of revolution indicated at 38 in dotted outline and determining the size of the bore in the workpiece 4.

The tool 34, which may be suitably tipped and shaped to define a cutting point 39, has a shank 40 removably mounted in a slot or groove 41 formed in the holder 33. Suitable screws 42 and 43 are provided for adjustably locating and clamping the shank 40 in position within the slot 41.

The tool 34 is located in a transverse plane forwardly of the axis or pin 35 so that upon swinging movement of the toolholder 33 in a forward direction away from the stop 37, the tool 34 will be retracted to define a clearance circle of revolution indicated generally at 44 located within the circle 38.

Means is provided for adjusting the toolholder 33 selectively into its operative or cutting position against the stop 37 or into its inoperative or retracted position. In the present instance, this means comprises a compression coil spring 45 which is seated at one end in a bore or recess 46 formed in the root of the notch 36 and at the other end in an alined bore or recess 47 formed in the rear or inner face of the toolholder 33. It will be understood that the spring is located diametrically opposite the pivot 35 and tends to urge the tool 34 into its inoperative or retracted position. A drawbar 48 extends slidably through a bore 49 in the spindle 11 and freely through an axial bore 50 in the toolholder 33. Suitable bushings 51 are fitted in opposite ends of the spindle bore 49 to guide the drawbar 48. Integral with the forward end of the drawbar 48 is a radially projecting finger 52 which has an arcuate face 53 in engagement with an inclined face 54 in the toolholder 33 at the forward end of the bore 50. Upon moving the drawbar 48 rearwardly, the finger 52 through engagement with the face 54 will cause the toolholder to swing against the pressure of the spring 45 into the operative or cutting position as determined by the stop 37.

The drawbar 48 may be actuated either manually, or automatically, in timed relation to the reciprocation of the carriage 3. More particularly, the rear end of the drawbar 48 projects axially from the spindle 11 and is provided with a conical abutment 55. Encircling the drawbar 48 within a counterbore 56 in the rear end of the spindle 11 is a coil compression spring 57 which tends to urge the drawbar rearwardly to move the tool 34 into operative position. One end of the spring 57 abuts against the inner end of the counterbore 56, and the other end abuts against two lock nuts 58 adjustably threaded onto the drawbar 48. Preferably, the spring 57 is considerably stronger than the spring 45. Consequently, the tool 34 is normally held in operative position, and is adapted to be moved into inoperative position by the spring 45 when the drawbar 48 is shifted forwardly against the pressure of the spring 57.

Mounted on the carriage 3 is a pivotal actuating member 59 having a pin 60 adapted for engagement with the conical abutment 55. The actuating member 59 is adapted for operation by a solenoid (not shown) to shift the drawbar 48 forwardly at the end of the forward or cutting movement of the carriage 3.

In operation, the workpiece 4 is supported in proper alinement with the spindle structure 1. With the carriage 3 in starting position, the tool 34 is maintained by the drawbar 48 under the pressure of the spring 57 in operative position against the positive stop 37. Upon forward movement of the carriage 3, with the spindle 11 rotating, the tool 34 will pass through and bore the workpiece 4 to the diameter of the circle of the revolution 38. During the boring operation, the cutting thrust acts in a direction to hold the tool 34 against the stop 37. At the end of the boring operation, the drawbar 48 is shifted forwardly against the pressure of the spring 57. This releases the toolholder 33 so that the spring 45 will act to swing the tool 34 into its inoperative position. This condition is maintained during the return movement of the carriage 3 so that the tool 34 will clear the finished bore. At the end of the return movement, the drawbar 48 is released and consequently the tool 34 is again returned into operative position for the next cutting cycle. Should the tool 34 contact the work during the return movement of the spindle structure 1 to the right, such contact will cause the tool to swing away from the stop 37 in a retracting movement so that only very light engagement, if any, with the finished bore can occur. Consequently, the spring 45 is and need be only comparatively light to impart an initial retracting force.

I claim as my invention:

1. A rotary toolhead comprising, in combination, a rotary body, a toolholder extending diametrically of and pivotally mounted at one end on said body for oscillation about an axis extending transversely of and located at one side of the axis of rotation of said body, positive stop means on said body at the other side of said axis of rotation and adapted for engagement by the free end of said toolholder to limit the rearward oscillation of said toolholder to an operative position at radial dead center, and a tool adjustably mounted on and solidly backed by said toolholder and projecting therefrom laterally of said axis of rotation to define a predetermined circle of revolution when in operative position and a lesser circle of revolution when out of said operative position.

2. A rotary toolhead comprising, in combination, a body adapted for rotation about a fixed axis and for axial reciprocation in a forward direction through a workpiece and then in a reverse direction out of the workpiece, a diametrical notch formed in the front face of said body, a clapper box slidably disposed in said notch for oscillatory movement therein about an axis extending transversely of the axis of said body and located at one side of the axis of said body, a tool mounted in said clapper box and projecting from the free end thereof radially of said box, stop means at the other side of the axis of said body for positively limiting the movement of said clapper box in a rearward direction to define an operative position in which said tool describes a maximum circle of revolution, said clapper box being movable away from said stop means with said tool moving in an arc defining progressively diminishing circles of revolution, spring means tending to urge said clapper box out of operative position, and means extending axially through said body for swinging said clapper box into operative position against the action of said spring means.

3. A rotary toolhead comprising, in combination, a body adapted for rotation about a fixed axis and for axial reciprocation in a forward cutting direction through a workpiece and then in a reverse direction out of the workpiece, a transverse notch formed in the front face of said body, a clapper box disposed in said notch for oscillatory movement therein about an axis extending at an angle to the axis of said body, a tool mounted in said clapper box and projecting from the free end thereof laterally of said body, stop means for positively limiting the rearward movement of said clapper box to define an operative position in which said tool describes a maximum circle of revolution, said clapper box being movable away from said stop means with said tool moving in an arc defining progressively diminishing circles of revolution upon movement of said body in said reverse direction, and a draw bar extending slidably through said body having an abutment with a curved surface coacting with a notch in their outer face of said clapper box and operative upon longitudinal movement in opposite directions respectively to confine said box against said stop means or to release said clapper box for movement away from said stop means.

4. A toolhead comprising in combination with a rotary spindle, a body secured coaxially to the forward end of said spindle for rotation therewith, a clapper box pivotally mounted in the forward end of said body for swinging movement about an axis extending transversely of the spindle axis, a positive stop on said body for limiting rearward swinging movement of said clapper box, a tool removably mounted in said clapper box and projecting radially therefrom to define a cutting circle of revolution when said box is in engagement with said stop, spring means tending to swing said box forwardly out of engagement with said stop into a position in which said tool describes a reduced circle of revolution, an axial draw bar extending slidably through said spindle and having a finger on its forward end in operative engagement with said box for moving said box rearwardly, and spring means of greater pressure than said first mentioned spring means for urging said draw bar rearwardly.

5. A toolhead comprising in combination with a rotary spindle, a body secured coaxially to the forward end of said spindle for rotation therewith, a clapper box pivotally mounted in the forward end of said body for swinging movement about an axis extending transversely of the spindle axis, a positive stop on said body for limiting rearward swinging movement of said clapper box, a tool removably mounted in said clapper box and projecting radially therefrom to define a cutting circle of revolution when said box is in engagement with said stop, an axial draw bar extending slidably through said spindle and having an abutment on its forward end in operative engagement with said box for moving said box rearwardly against said stop, and spring means for urging said draw bar rearwardly.

6. A toolhead comprising in combination with a rotary spindle, a body threaded at one end onto said spindle and formed in the other end with a diametrical notch having flat parallel sides, an elongated rectangular clapper box substantially coextensive in length with said notch, and mounted therein for swinging movement about an axis located at one side of the axis of said body, a medial longitudinal groove formed in the outer face of said clapper box and open to one end thereof and closed at the other end, said groove having a flat root surface and flat parallel side surfaces, a cutting tool disposed in said groove against said root surface, an adjusting screw threaded into the closed end of said groove in end abutment with said tool, an adjusting screw threaded into the side of said groove against said tool to clamp the latter in position, and stop means for defining the maximum circle of revolution of said tool, said clapper box being movable from said stop means to reduce the circle of revolution of said tool.

7. A rotary toolhead comprising, in combination, a rotary body, a toolholder extending diametrically of and pivotally mounted at one end on said body for oscillation about an axis extending transversely of and located at one side of the axis of rotation of said body, two spaced parallel stop pins projecting longitudinally on said body at the other side of said axis of rotation and adapted for engagement by the free end of said toolholder to limit the rearward oscillation of said toolholder to an operative position at radial dead center, a compression spring located between said stop pins and acting at opposite ends respectively against said body and the free end of said tool holder normally to urge said toolholder out of said operative position, and a tool adjustably mounted on and solidly backed by said tool holder and projecting therefrom laterally of said axis of rotation to define a predetermined circle of revolution when in said operative position and a lesser circle of revolution when out of said operative position.

CHARLES MARTIN.